United States Patent
Bensberg et al.

(10) Patent No.: US 10,838,926 B2
(45) Date of Patent: Nov. 17, 2020

(54) TRANSPARENT ACCESS TO MULTI-TEMPERATURE DATA

(71) Applicants: Christian Bensberg, Walldorf (DE); Christian Kraus, Walldorf (DE); Axel Herbst, Walldorf (DE); Stefan Elfner, Walldorf (DE); Holger Schwedes, Kraichtal (DE); Heiko Gerwens, Walldorf (DE)

(72) Inventors: Christian Bensberg, Walldorf (DE); Christian Kraus, Walldorf (DE); Axel Herbst, Walldorf (DE); Stefan Elfner, Walldorf (DE); Holger Schwedes, Kraichtal (DE); Heiko Gerwens, Walldorf (DE)

(73) Assignee: SAP SE, Walldorf (DE)

( * ) Notice: Subject to any disclaimer, the term of this patent is extended or adjusted under 35 U.S.C. 154(b) by 986 days.

(21) Appl. No.: 14/043,281

(22) Filed: Oct. 1, 2013

(65) Prior Publication Data
US 2015/0095307 A1 Apr. 2, 2015

(51) Int. Cl.
*G06F 16/21* (2019.01)
*G06F 16/185* (2019.01)
*G06F 16/27* (2019.01)

(52) U.S. Cl.
CPC ............ *G06F 16/21* (2019.01); *G06F 16/185* (2019.01); *G06F 16/278* (2019.01)

(58) Field of Classification Search
CPC ......... G06F 17/30584; G06F 17/30221; G06F 17/30289; G06F 3/0649
See application file for complete search history.

(56) References Cited

U.S. PATENT DOCUMENTS 6,741,998 B2 * 5/2004 Ruth ................. G06F 17/30893
702/21
7,899,810 B2 * 3/2011 Cambot ............ G06F 17/30398
707/713

(Continued)

OTHER PUBLICATIONS

Oradea Database SQL Reference 10g Release 2 (10.2), Chapter 9, p. 9-10. By Diana Lorentz et al. Published Dec. 2005. Accessed Aug. 4, 2015 from <https://docs.oracle.com/cd/B19306_01/nav/portal_1.htm>.*

(Continued)

*Primary Examiner* — Robert W Beausoliel, Jr.
*Assistant Examiner* — Arthur Ganger
(74) *Attorney, Agent, or Firm* — Mintz Levin Cohn Ferris Glovsky and Popeo, P.C.

(57) ABSTRACT

A system, a method, and a computer program product for providing transparent access to multi-temperature data are disclosed. A query for accessing data is received. The query includes at least one selection parameter for retrieval of data. The data is stored in a plurality of partitions of a database system. Each partition has a maximum data value per column, a minimum data value per column, and a predetermined date associated with the data contained in the partition. A determination is made whether at least one selection parameter is greater than the minimum data value per column and less than the maximum data value per column. The queried data is retrieved from the partition using the predetermined date associated with the data contained in the partition.

18 Claims, 10 Drawing Sheets

(56) References Cited

U.S. PATENT DOCUMENTS

| | | | |
|---|---|---|---|
| 2005/0262382 A1* | 11/2005 | Bain | G06F 9/52 |
| | | | 714/4.4 |
| 2006/0235908 A1* | 10/2006 | Armangau et al. | 707/204 |
| 2009/0063396 A1* | 3/2009 | Gangarapu | G06F 17/30321 |
| 2009/0276477 A1* | 11/2009 | Thuringer | G06F 17/30306 |
| 2010/0082601 A1* | 4/2010 | Ramesh | G06F 17/30483 |
| | | | 707/714 |
| 2011/0040937 A1 | 2/2011 | Augenstein et al. | |
| 2011/0282830 A1* | 11/2011 | Malige et al. | 707/609 |
| 2013/0166553 A1* | 6/2013 | Yoon | G06F 17/30312 |
| | | | 707/737 |
| 2013/0304707 A1* | 11/2013 | Herbst | 707/667 |
| 2014/0095547 A1* | 4/2014 | Guo et al. | 707/792 |
| 2015/0186447 A1* | 7/2015 | Milousheff | G06F 17/30289 |
| | | | 707/694 |

OTHER PUBLICATIONS

Ahn, Ilsoo and Snodgrass, Richard. "Partitioned Storage for Temporal Databases." Inform. System. vol. 13. No. 4. Great Britain. (1988):369-391. [retrieved on Jan. 1, 1988].
Anonymous. "Oracle 8i Enterprise Edition Partitioning Option." *Announcement Oracle*. Oracle. XP002482801. (Feb. 1, 1999):1-8.
Leverenz, Lefty and Rehfield, Diana. "Chapter 11: Partitioned Tables and Indexes." *Oracle8i Concepts*, vol. 1, Release 8.1.5. Oracle8i Concepts, vol. 1, Release 8.1.5. Oracle Corporation, Redwood City, CA, USA. (Feb. 1, 1999): Chapter 3 (3.1-3.10) and Chapter 11 (11.1-11.66).

* cited by examiner

TRANSPARENT ACCESS TO MULTI-TEMPERATURE DATA

This disclosure relates generally to data processing and, in particular, to transparent access of data.

BACKGROUND

Businesses use a plurality of business process applications and/or services in their business operations. Applications and/or services can be programs that an end-user runs to accomplish certain tasks and can work in conjunction with one or more back-end systems, which can store the data to be worked on, such as, for example, business objects and other business data, as well as logic for manipulating the data, such as for example transactions or other business logic. In order to accomplish various tasks, the applications and/or services may need to access various data, which can be stored in various databases. An example of such database is the SAP HANA Database, which is a column-oriented, in-memory database available from SAP AG, Walldorf, Germany.

The data that is accessed by the applications and/or services can be stored based on the age, importance, and/or any other factors related to the data. For example, data that is important and/or frequently, e.g., business-relevant (or "hot") data can be stored in fast, expensive storage media that can be quickly accessed, whereas data that is less relevant or less-frequently accessed (or "cold" data) can be stored in a slow, less expensive storage media. The Hot data can occupy top levels of storage hierarchy so that it can be easily accessed. Data "temperature" ("hot" or "cold") can be assigned to the data based on usage, access, storage media, and/or any other factors.

The data can be stored redundantly at different levels of a storage hierarchy. However, it is preferable that only the hot data occupy top level(s) of storage hierarchy to save costs. After data temperature has been assigned to particular business object data and appropriate data storage location has been determined, the data can be appropriately queried/accessed. However, given the multiple temperatures of the stored, it is difficult to determine how to optimally access the data at different storage levels, so that data queries do not necessarily load or even process data having a low temperature if such data would not contribute to the result set of the query. Business rules are applied on the data that ensure that all data that semantically belong to each other from a holistic business perspective can be stored with the same and/or a higher temperature. Thus, even during join operations, it can be intrinsically ensured that a join will return the full result sets from business perspective. For example, if a join is executed on the hot data, there is no need to check for join partners in a cold data. It is not required to perform statistical operations and/or other similar operations on the cold data to determine whether there might be join partners. From a perspective of a single query, it can be assured that there are none. A single query can always return a full data set that the user has requested. However, the difficulty exists in determining how far into the cold data a query should reach.

Some conventional approaches to resolving this problem involve the user specifying whether cold data is to be considered or not. This is not feasible as the user typically is not aware of the temperature that has been assigned to the data and hence, is not able to identify whether cold data needs to be queried. This can lead to the end user not receiving the data the user requested (e.g., the user can be forced to re-run the query with a lower temperature delimiter), performance penalties due to unnecessarily evaluating data of higher I/O latency, and processing of a higher data volume. Another conventional approach requests application logic to derive the determination of whether hot/cold data needs to be queried and change all access coding, so that hot and/or cold data is queried explicitly. Such approach is implementation- and cost-prohibitive.

Thus, the conventional approaches failed to provide transparent data access that can avoid (content-wise) unnecessary data load and processing costs without placing a decision burden on end users or application developers in deciding whether data of lower temperatures should be accessed.

SUMMARY

In some implementations, the current subject matter relates to a computer-implemented method for providing a transparent access to multi-temperature data. The method can include receiving a query for access of data, the query containing at least one selection parameter for retrieval of data, wherein the data is stored in a plurality of partitions of a database system, each partition in the plurality of partitions having a maximum data value per column, a minimum data value per column, and a predetermined date associated with the data contained in at least one partition of data, determining whether at least one selection parameter is greater than the minimum data value per column and less than the maximum data value per column, and retrieving, based on the determining, the queried data from at least one partition in the plurality of partitions using the predetermined date associated with the data contained in at least one partition of data in the plurality of partitions. At least one of the receiving, the determining, and the retrieving can be performed on at least one processor of at least one computing system.

In some implementations, the current subject matter can include one or more of the following optional features. The predetermined date can determined based on a creation date of data associated with a business object being queried by the received query. The business object can include at least one of the following: an open business object and a closed business object. The data associated with an open business object can be stored in a hot data partition and data associated with a closed business object is stored in a cold data partition, wherein the hot data partition contains data having a date that is more recent than the predetermined date and the cold data partition contains data having a date that is older than the predetermined date.

In some implementations, the method can further include moving the data stored in the hot data partition to the cold partition based on at least one of the following: when the date of the data stored in the hot data partition becomes older than the predetermined date and upon receiving an indicator indicating that the data stored in the hot data partition should be moved to the cold data partition.

In some implementations, the cold data partition can include a predetermined cold data partition date, whereby data stored in the cold data partition and having a date that is older than the predetermined cold data partition date is moved to another cold data partition, wherein the another cold data partition stores data having a date that is older than the predetermined cold data partition date.

In some implementations, the method can also include determining whether the queried data is stored in at least two partitions of data, joining, based on the determining, at least two partitions of data, and retrieving the joined data.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
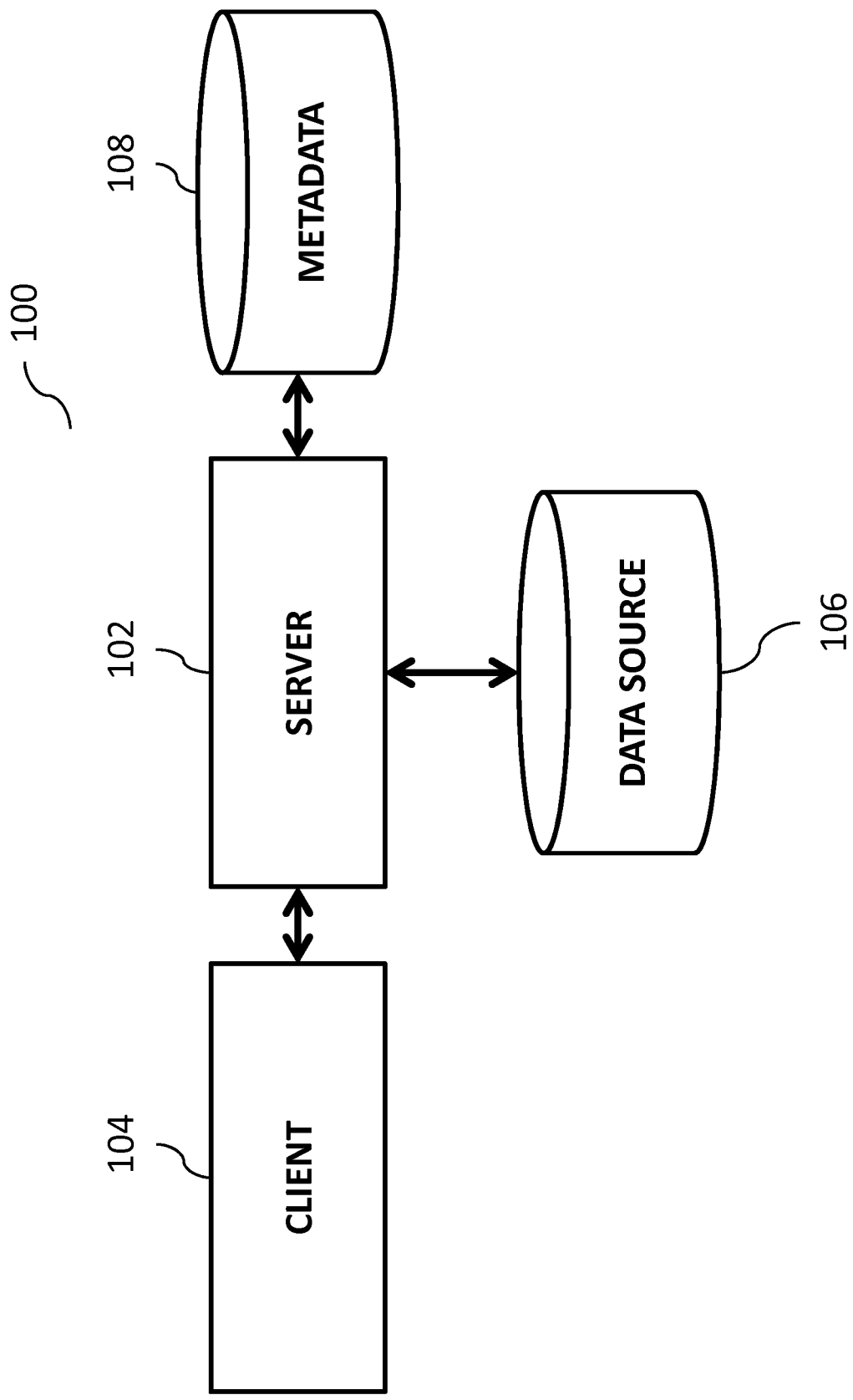
FIG. 1 is an exemplary system for providing transparent access to data of multiple temperatures, according to some implementations of the current subject matter.

FIG. 1 illustrates an exemplary system 100 that can provide a transparent access to multi-temperature data that is stored in various storage locations, according to some implementations of the current subject matter. The system 100 can include a server 102, a client 104, a data source 106, and a metadata database 108.

The server 102 can be a query server that the client can send a query or a request to obtain specific data. The server 102 can process the received query (e.g., a structured query language ("SQL") query) and determine which data sources need to be accessed for the purposes of generating a response to the client's query.

The data source 106 can include any query-responsive data sources, e.g., an SQL relational database management system. In some implementations, the data source can include a relational database, a multi-dimensional database, an eXtendable Markup Language ("XML") document, or any other data storage system storing structured and/or unstructured data. The data stored in the data source 106 can be distributed among several relational databases, warehouses, multi-dimensional databases, and/or any other data sources, and/or any combinations thereof. The data source can include one or more On-Line Analytical Processing ("OLAP") databases, spreadsheets, text documents, presentations, etc. The data source 106 can be also implemented in a Random Access Memory ("RAM"), one or more fixed disks (e.g., persistent memory for storing their respective portions of the full database), an "in-memory" database (where RAM can be used for cache memory and for storing its entire respective portion of the full database). Further, the data contained in the data source can include tabular data, row-based data stored in row format, column-based data stored in columnar format, and object-based data. The data source can support multi-tenancy by providing multiple logical database systems which are programmatically isolated from one another. The data contained in the data source can be indexed and/or selectively replicated in an index to allow fast searching and retrieval.

The metadata database 108 can include information about structure, relationships and meaning of the data contained in the data source 106. The metadata can provide definitions for a schema of database tables stored in the data source 106, which can specify names of the database tables, columns of the databases tables, data types associated with columns, and any other information.

The client 104 can be a device executing a software application and can allow interaction with the server 102 via appropriate user interfaces that can be associated with the client 104. The user interfaces can be in formats that can be associated with a Web Browser' pages (e.g., HTML, JAVA, etc.) and/or any other format.

In some implementations, the current subject matter system can retrieve business object data or any other data in response to queries based on various selection criteria or parameter(s) which can have a correlation to time-based criteria that can be used for partitioning. In a typical access pattern, a date restriction or a status restriction can be used. A status restriction can be part of logic for separating hot data from cold data, which is discussed below. The date restriction can include criteria to partition the hot data from the cold data as well as partition the cold store itself. When executing a query, partitions of data can be excluded by comparing the selection criteria for a column in a partition with predetermined maximum and minimum values for each partition. More than one partition may need to be accessed in response to the query based on the above selection and date restrictions. If a match is found with regard to the selection criteria, the date restriction can be used to obtain date from various partitions (e.g., hot data partitions, cold data partitions).

In some implementations, the current subject matter system can separate and distinguish between hot and cold stored data to provide a transparent access to such multi-temperature data. As stated above, the hot data can be the data that is either operationally essential and/or frequently used by a business application, and the cold data can be the data that is not used frequently and/or is not essential to the proper operation of a business application. In some implementations, using an age of data, a determination can be made whether a set of table entries in different database tables belonging to the same business object ("BO") can be either hot or cold. In some implementations, a BO that is used for operational, transactional processing is hot and/or uses and/or access data that is essential and/or frequently used and thus, can be termed as "hot" data. Such BO can either be open, can take part in an open process chain, and/or is not old enough to be determined to be cold (with respect to some base date that can typically be a start date or an end date of the lifecycle of a document, an object, etc.).

In some implementations, data stored across various tables in database(s) as partitions of data can be accessed by various applications and/or components. Some partitions can be hot partitions and some partitions can be cold partitions. In some implementations, the current subject matter can implement a partition criterion that includes information about the age of the data in the partition. The criterion can be a column that contains an age data, which can indicate whether the data contained in that partition is hot or cold. The criterion can also include a start date as of which data in the business object becomes a cold data (which can be the same date for all table entries of a business object). In some implementations, a document can start as a hot data, which can be stored in a hot storage media, but then can be moved to a cold storage media after a particular date and/or when it, for example, fulfills certain requirements.

Figure 2:
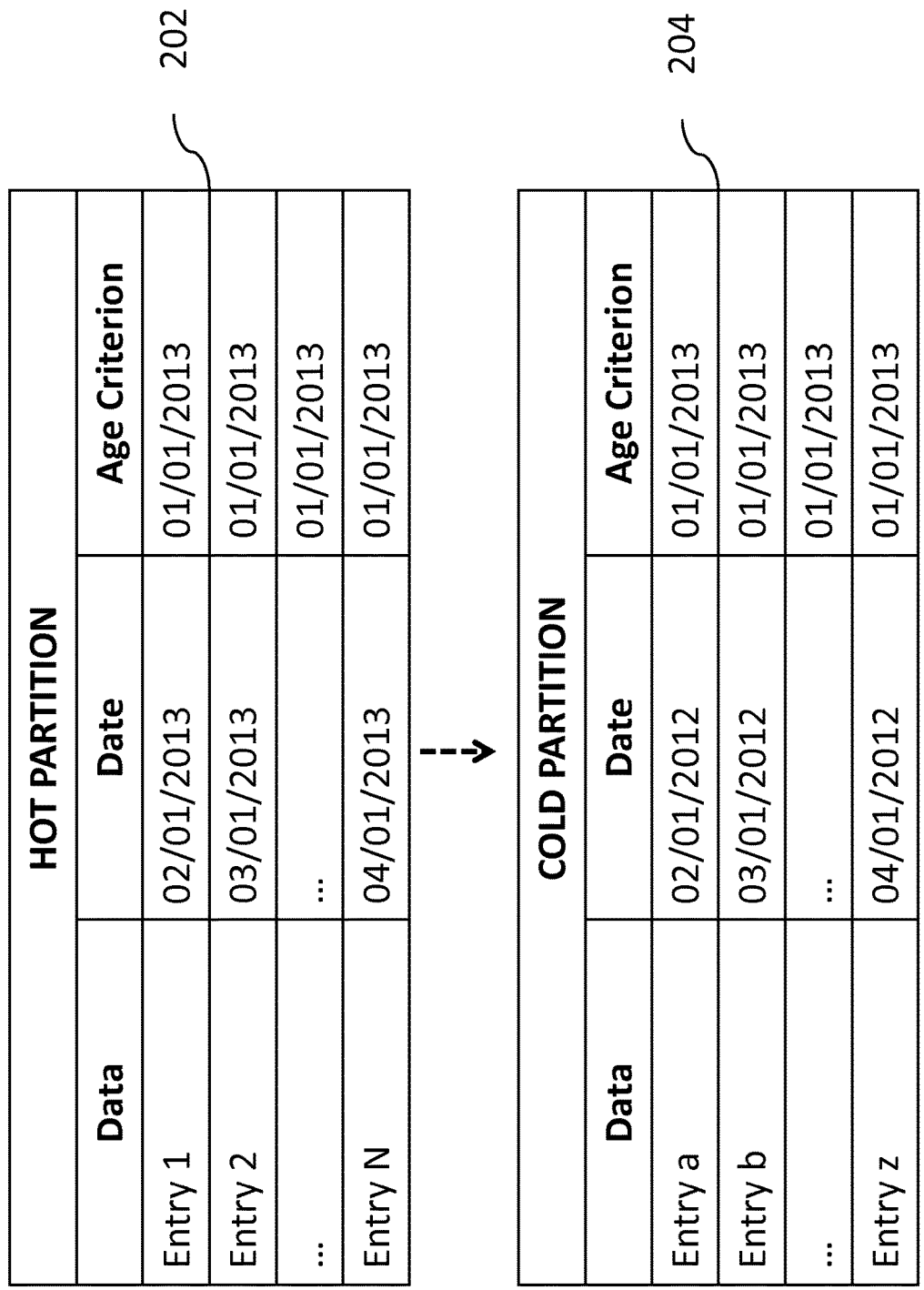
FIG. 2 illustrates an exemplary hot partition and a cold partition.

FIG. 2 illustrates exemplary hot partition 202 and cold partition 204. The partitions can include data that is stored as Entries 1, 2, . . . , N in the hot partition 202 and Entries a, b, . . . , z in the cold partition 204. Each entry can include information about the age of data, which can be stored in a separate column (and/or in any other fashion) and be associated with a particular data entry in the partition. The age of data information (e.g., "02/01/2013" for "Entry 1" in the hot partition 202) can indicate a particular date with regard to an entry (e.g., a document) in the table, which can be a date of creation of the entry, date of last modification of the entry, date of last access of the entry, date when the object was actively closed by the application (e.g., customer has paid the bill), and/or any other date information that can be indicative of the age of the entry. The partitions can also include an age criterion column information that can indicate a specific date (e.g., "01/01/2013") that can determine when specific data entries in the hot partition 202 are to be moved to the cold partition storage 204. As shown in FIG. 2, data entries that are older than Jan. 1, 2013 will be moved to the cold partition 204, whereas the data entries that are younger than Jan. 1, 2013 can remain in the hot partition storage. In some implementations, a row in the hot partition does not have an age criterion set until the object is explicitly marked by the application. Such row can have a NULL and/or similar value that can mark the row as being hot. In some implementations, the storage media can include one or more hot partitions and/or one or more cold partitions. The age of data in the partitions can be identified in any other fashion. In some implementations, the data in the cold partition 204 can migrate back into the hot partition if it becomes essential for a particular business object and/or process and/or is frequently accessed, for example, as a result of queries, and/or for any other reason. Further, the data in the cold partition can also be moved to another cold partition that can contain data that is beyond a second age date that can be further removed from the first age date information.

In some implementations, the current subject matter can provide a transparent access to hot and cold data, where the cold data can be accessed only on an as-needed basis, because access to the cold data can be much more expensive and/or slower than access to the hot data and/or in-memory data and can potentially involve access to a bigger volume of data. In some implementations, the current subject matter can provide such access while eliminating a need to scan columns in the cold storage media to obtain requested data, indexing the cold data, and/or consuming memory capacity through these operations.

In some implementations, the data that can be accessed by business process applications and/or business objects is typically accessed based on a date restriction (either explicit and/or implicit date restriction) and/or a status restriction. The date restriction can be included in a data access request that can be issued by a business process application and/or business object and/or a user and can include an aging date, which can be criteria for partitioning hot and/or cold data stores as well as the cold store itself. The status restriction can involve a status of data, which can be part of the logic of separation between hot data and cold data. Thus, this approach can make use of the fact that most selection criteria include a correlation to the partition criteria.

In some implementations, to obtain a proper data set in response to a query, the current subject matter system can access the hot and/or cold data partitions, as stored in respective hot and cold storage media, based on selection criteria. The selection criteria can be provided as part of a query that is issued by a business process, a business object, a user, and/or in any other fashion. During data retrieval, the selection criteria can be analyzed and compared to maximum and minimum values for a particular data partition that is being accessed. Partitions that are outside the maximum and/or minimum values can be excluded from the resulting dataset. More than one data partition can be accessed, which can include a hot data partition, a cold data partition, and/or a plurality of data partitions. In some implementations, a hot data partition can be always accessed.

The following discussion illustrates an exemplary operation of the current subject matter. Assuming that a data access request is issued by a business process, a business object, and/or a user, the current subject matter system determines an "age date" constraint, which can be indicative of a specific cut-off date of the data, beyond (or older than) which the data can be treated as a cold data. The age data constraint, for example, can indicate that any business object that has a date that is older than the date indicated by the age date constraint will be treated as a cold business object. In some implementations, such date can be a start date of the business object (like a posting date of an accounting document). The selection criteria can include a posting date (e.g., a document posting date), which can have a correlation to a predetermined age date. It can also include a business year that can define (explicitly and/or implicitly) a posting date interval (e.g., from 2012 to 2013). Based on the intersection of this interval and minimum/maximum values of the aging date per partition, the current subject matter can determine whether or not a particular partition (e.g., a cold partition) can be excluded from the resulting data set.

In some implementations, the current subject matter can retrieve data associated with an open business object, which can stay open an arbitrary period of time. The data associated with open business objects can be stored in a hot storage medium, whereas data associated with closed business objects can be stored in a cold storage medium. In some implementations, data associated with recently closed business objects can be still stored in a hot storage medium in view of various date restrictions that can prevent movement of the data associated with the recently closed business object from the hot storage medium to the cold storage medium. For example, the restriction can indicate that if the age date of the recently closed business object stored in the hot storage medium is higher than the maximum value associated with the cold storage medium, then the data associated with the recently closed business object should remain in the hot storage medium and not be moved into the cold storage medium.

In some implementation, business objects can include various keys containing sequences of numbers or a single number. Key(s) can securely identify and/or call business object(s), such as during an execution of a business application and/or a business object. The numbers in these sequences of numbers can appear in a consecutive order and can further include a specific start date as to when the sequence or numbers in the sequence were created. In some implementations, the current subject matter can assign minimal and/or maximal numbers for every partition of the sequence of numbers to assist in determining the age of data that can be contained in or assigned to the business object.

In some implementations, a key for a particular business object can include other information in addition to the sequence of numbers or a specific number from that sequence. Thus, the number (or a sequence of numbers) by itself might not be unique, but will be unique only when combined with other elements present in the key. The elements of the key can be stored in a column-based format and as such, in addition to determining what the number in the business object key is, other columns of the business object key will have to be ascertained. Thus can result in clusters of information for each combination of non-number key elements that can have a correlation to the start date of each cluster. In some implementations, the current subject matter can store information about minimum and/or maximum values per each partition of data and column to determine an age of data contained in or assigned to that business object.

In some implementations, other types of data, such as globally unique identifier ("GUID") data which identifies computer software, can also contain a machine dependent part and/or a time dependent part. Similar to the discussion above, the current subject matter system can assign minimal and/or maximal values to the GUID data to ascertain whether or not a particular data is hot or cold.

In some implementations, the current subject matter system can also determine whether partitions of data are hot or cold based on non-perfect correlations in connection with a specific date. These situations can arise when values in columns of data partitions (such as those, used in selection criteria) are "near" a corresponding aging date (for example, the values fall within a specific interval of values that is close to the aging date). As a result, there can be a small overlap of such intervals that can be assigned to different data partitions. In some implementations, the query can include all relevant partitions. In some implementations, to account for these scenarios, the values in the intervals that can be close to a specific aging date, can be determined to be hot and thus, included in the hot storage. The latter can be used to create cold partitions with good correlations so that the number of cold partitions that have to be considered in a given query can be small. In some implementations, this mechanism can prevent a scenario where many partitions have to be considered in queries.

The following is a discussion of some exemplary implementation aspects of the current subject matter system that allows for ascertaining "temperature" of a particular data partition and whether such partition should be included in a hot storage or moved to a cold storage.

In some implementations, the current subject matter system can used in databases that contain a plurality of data partitions. The partitioning mechanism can include range partitioning, which can select a data partition by determining if a particular partitioning key is located inside a certain range. For example, the range partitioning mechanism can partition all rows data using a column zipcode having a value between 50000 and 59999. Thus, using the range partitioning mechanism, the current subject matter system can specify a single partitioning column and range(s) of values per partition. In some implementations, a developer can specify particular range(s) of value. Alternatively, or in addition to, the current subject matter system can automatically specify a range of "from-to" values for all columns based on the information contained within the database. This can be referred to as a "partition profile." Unlike typical implementation of a range partitioning, such "partition profile" can store "from-to" values for all columns as opposed to just one column.

Figure 3:
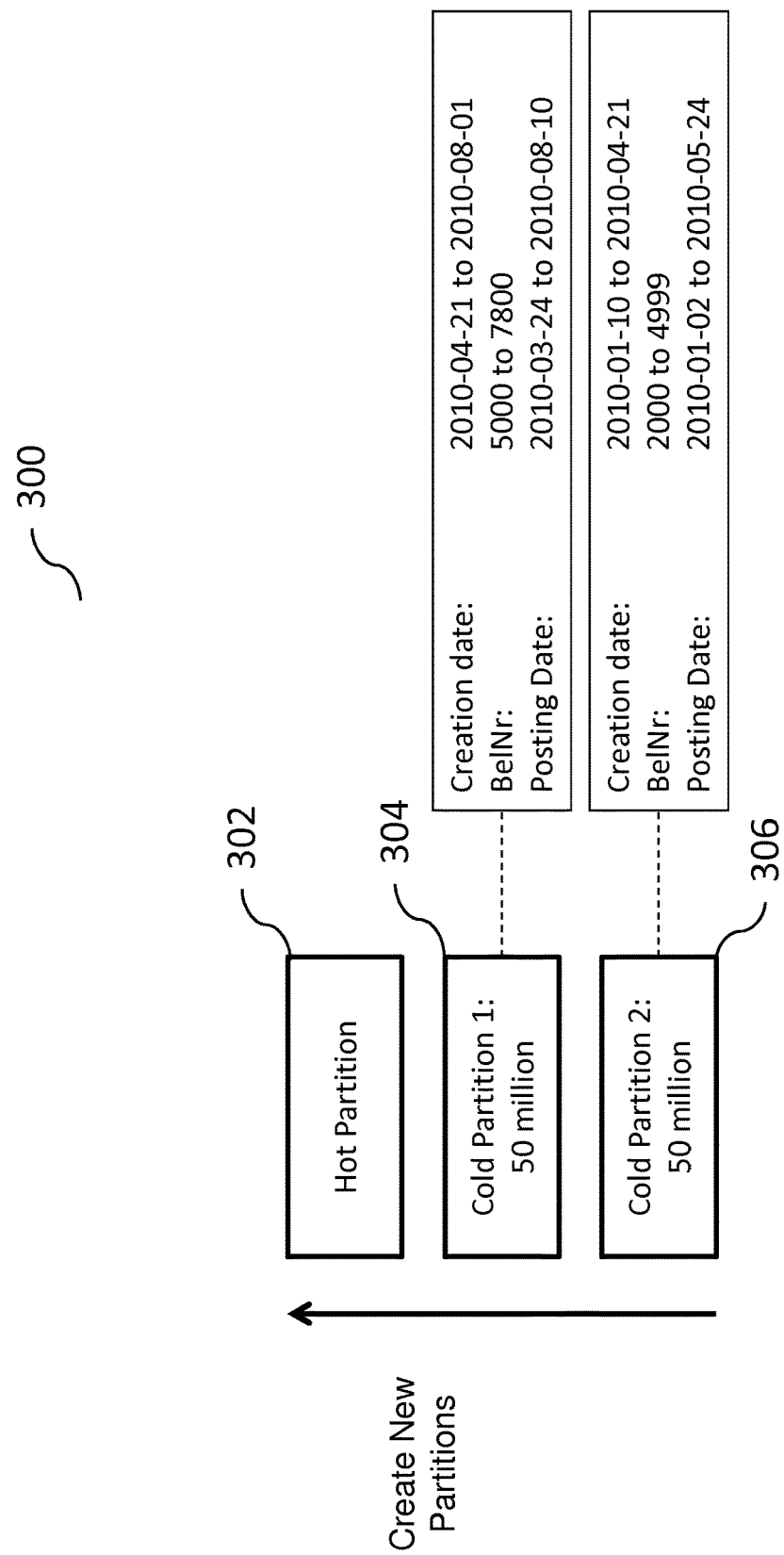
FIG. 3 illustrates an exemplary database containing partitions, according to some implementations of the current subject matter.

FIG. 3 illustrates an exemplary database 300 containing partitions 302, 304, and 306, according to some implementations of the current subject matter. The records in the database can be stored in various physical storage locations having various properties (e.g., a hot partition can be stored a quick-access memory location and a cold partition can be stored in a slow access memory location). The partition 302 can be a hot partition and partitions 304 and 306 can be cold partitions. In some implementations, once a partition reaches 50 million rows, the partition can become a cold partition and thus, be closed, and a new hot partition can be created for storing data (as indicated by an "up" arrow in FIG. 3). Each cold partition 304, 306 can include a partition profile that can identify various information that can be associated with that partition. For example, cold partition 304 can include a data or a record creation date range as being from 2010-04-21 to 2010-08-01 (any records that have a more recent creation date can be located in a hot partition; any records that have a creation date that is older than 2010-04-21 can be located in the other cold partition 306), the number of items range being from 5000 to 7800 (any records having numbers that are greater than 7800 can be located in a hot partition; any records having numbers that are less than 5000 can be located in the other cold partition 306), and a data or a record posting date range from 2010-03-24 to 2010-08-10 (any records that have a more recent posting date can be located in a hot partition; any records that have a posting date that is older than 2010-04-21 can be located in the other cold partition 306). The partition 306 can include a creation date range of 2010-01-10 to 2010-04-21, number range of 2000 to 4999, and a posting date range of 2010-01-02 to 2010-05-24.

When a query to the database is issued (e.g., an SQL query), the current subject matter system can analyze the query, including its WHERE clause(s), and determine which database partition to analyze in order to pull an appropriate data. For example, if a query calls for data that has been posted after 2010-06-01, the current subject matter system will analyze the hot partition 302 and cold partition 304, but it will not analyze partition 306 as it does not include any records that have been posted after 2010-06-01.

Figure 4:
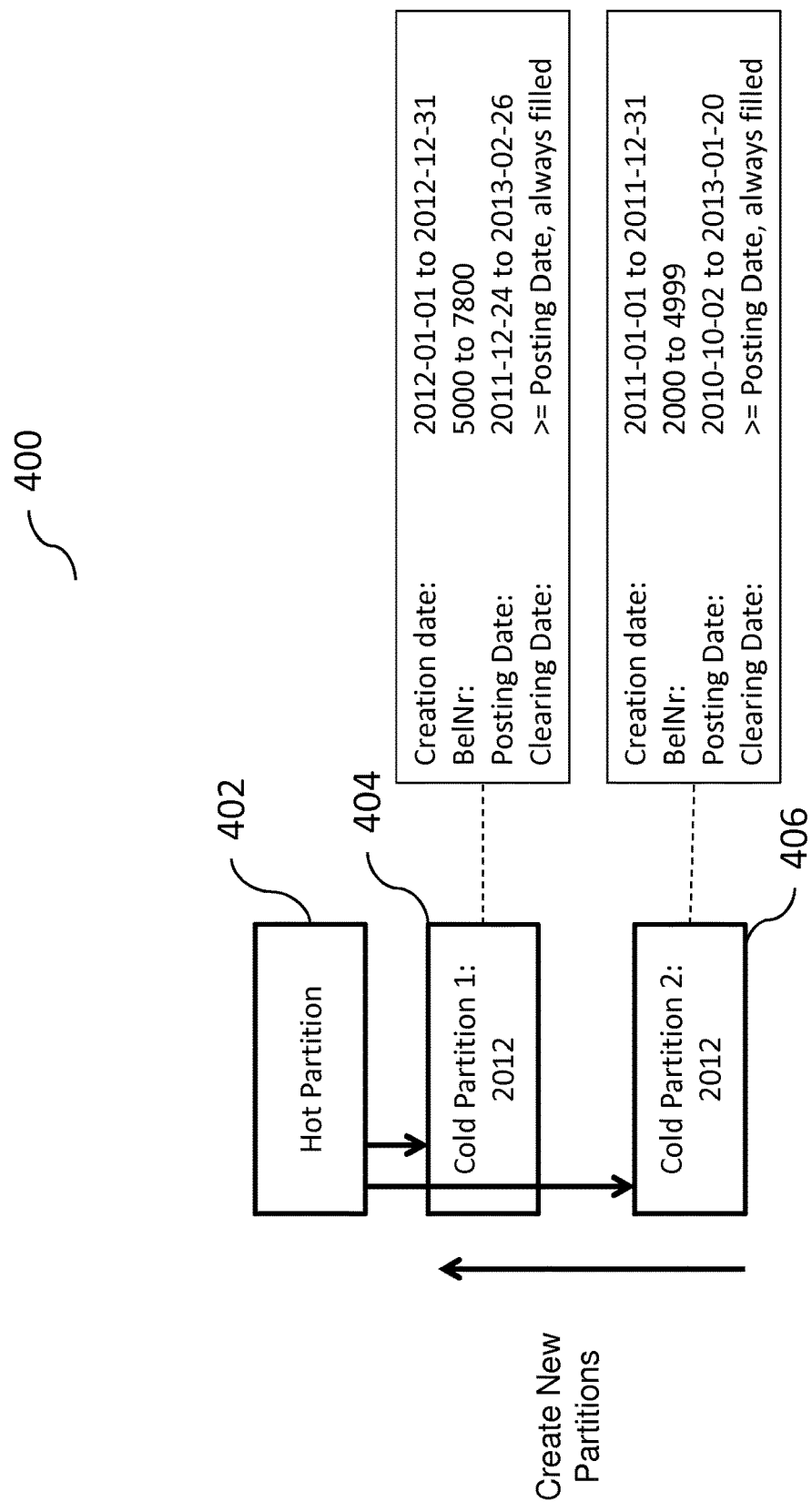
FIG. 4 illustrates another exemplary database containing a hot partition and cold partitions, according to some implementations of the current subject matter.

FIG. 4 illustrates another exemplary database 400 containing a hot partition 402 and cold partitions 404, 406, according to some implementations of the current subject matter. The records in the database 400 can be stored in various memory locations. The database 400 can include only a single hot partition 402 and a plurality of cold partitions 404, 406. The cold partition 404 can include records having a creation date between 2012-01-01 to 2012-12-31 (i.e., records created in 2012), and the cold partition 406 can include records having a creation date between 2011-01-01 to 2011-12-31 (i.e., records created in 2011). Once records in the hot partition 402 meet and/or exceed a certain threshold (e.g., a clearing date), those records can be moved to one of the cold partitions 404, 406. No new hot partitions are created and the hot partition is not re-interpreted as a cold partition (as in FIG. 3). Only new cold partitions can be created to accommodate cold data. The hot partition can always stay open and can accept new records. Further, when an application closes a business object, the records, that can be associated with that business object and that are stored in the hot partition, can be moved to a cold partition.

Each partition can include its own partition profile that can be characterized by a record creation date, number range, record posting date, and a clearing date threshold. The record creation date can be the date indicative of when the record was created, the record posting date can correspond to the record posting date, and a clearing date can be based on a particular posting date. Each of these dates can correspond to a specific date range that is assigned for a specific partition in a particular date category associated with a record. The number range can correspond to a specific number associated with a record.

In some implementations, records in the partitions 402, 404, and 406 are moved based on a particular clearing date. The hot partition 402 can contain records that are new and open based on a particular clearing date. The clearing date can be based on a posting date associated with a record. If the clearing date is greater than the posting date of the record, the record is moved from one partition to another (e.g., from hot partition 402 to the cold partition 404 or the cold partition 406; or from cold partition 404 to the cold partition 406).

In some implementations, the current subject matter system can perform joins of records and/or partitions of data, where the data can be stored in various temperature-based storage locations. A join can combine records from two or more tables in a database and can create a set that can be saved as a table or used as is. In some implementations, a join can combine fields from two tables by using values that can be common to each. In some implementations, when a join is performed by a system (such as the SAP HANA database, developed by SAP AG, Walldorf, Germany), a plan can be created, which can correspond to an ordered sequence of steps for accessing and combining the data. In particular, the plan can describe which tables and/or partitions of data have to be joined together.

In some implementations, the current subject matter can perform joins of partitions and/or tables that are can be located in hot and/or cold storage locations. For example, if two tables are to be joined based on a particular join attribute, the current subject matter system can analyze a first table based on the join attribute and determine which, if any, partitions of the first table are relevant and should be used in the join. Then, the current subject matter system can analyze the second table and determine which partitions of the second table are relevant to the join without analyzing the content of all partitions of that table.

In some implementations, during analysis of the tables to be joined, the current subject matter system can generate a query join plan based on the knowledge of the boundaries of a business object that can implement the tables, where the business object has been moved to a cold partition. In some implementations, the application developer can know which tables belong to a business object and whether the corresponding tables share the same temperature values for the same object. This can be specified as a hint in a query. For example, this can be specified in an "ON" clause of the join: ON table1.temperature=table2.temperature. During plan generation of the database, this information can be leveraged in a way that only the corresponding partitions are joined with each other respectively. This concept can be addressed as a "co-located join" . . . . In a co-located join, corresponding records of partitions being joined together can exist on the same node in a database and thus, no data needs to be moved to another node to perform the join.

Figure 5:
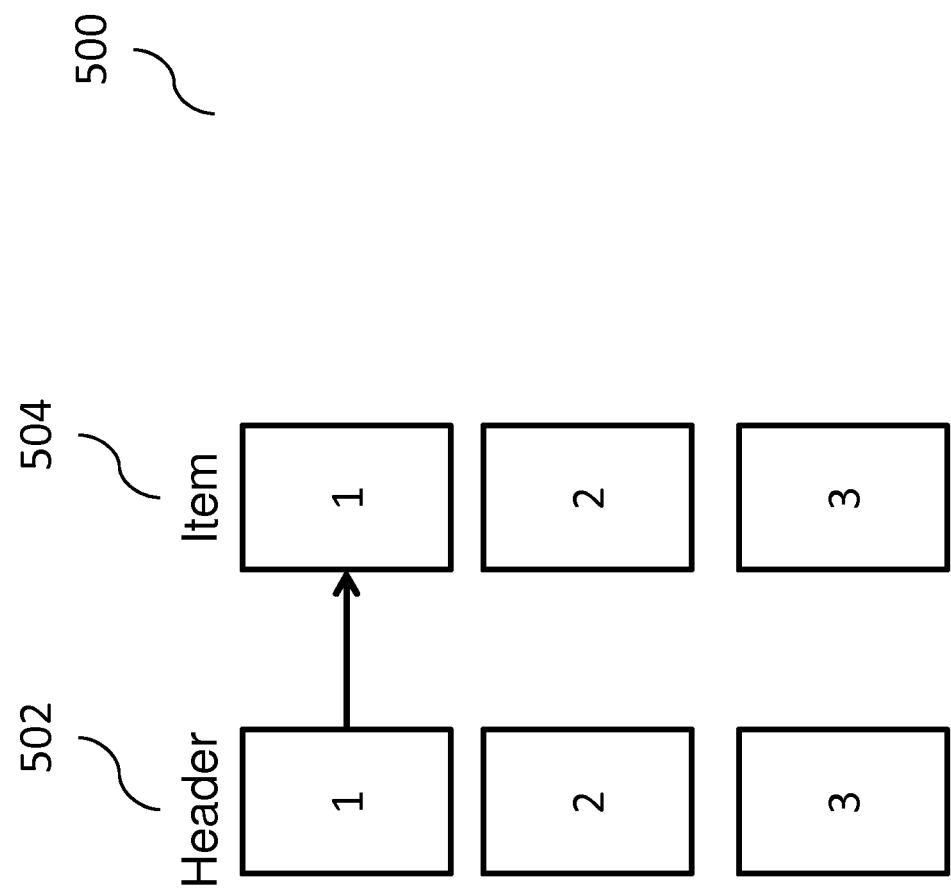
FIG. 5 illustrates an exemplary co-located join operation, according to some implementations of the current subject matter.

FIG. 5 illustrates an exemplary co-located join operation 500, according to some implementations of the current subject matter. The join operation 500 can be performed using the following SQL code:

```
SELECT * FROM header AS h INNER JOIN item AS i
    ON h.id = i.id
        AND h.temperature = i.temperature
        WHERE h.creation_date = '2009'
```

The above code illustrates that the records in the "header table h" 502 are to be joined with records in the "item table i" 504, as shown in FIG. 5. The relevant data records are delimited by a particular creation date, which is 2009 in this join. The two tables can have a "temperature" column which can be used as a partitioning column. An application developer who writes the join statement can be aware that the two tables belong to the same business object and hence, the corresponding rows of the tables can be aged together with the same date. From a semantic point of view, "ON h.id=i.id" can be sufficient. However, since the developer knows that the tables are part of the same business object, the developer can specify a hint of "h.temperature equals i.temperature". This information can then be leveraged during plan generation. Assuming that "h.creation_date='2009'" indicates that based on the "partition profile", the value has to be in partition 1 of the header table. Without any further optimization, it can be required that partition 1 of the header table is joined with all three partitions of the item table. With the additional hint that the temperatures are the same, the plan can already be created in a way that only partition 1 of the item table is considered during execution. As shown in FIG. 5, only partitions 1 of the header 502 and the item 504 are being joined together (partitions 2 and 3 of the header and the item are not involved in the join; however, partitions 2 and 3 of the header can be evaluated separately (for example, in a different join statement)). In some implementations, a query optimizer can be implemented to determine a particular order in which the join is to be performed. However, in some implementations, it might not be possible for the developer to provide such indication in the query join plan. This scenario is illustrated in FIG. 6.

Figure 6:
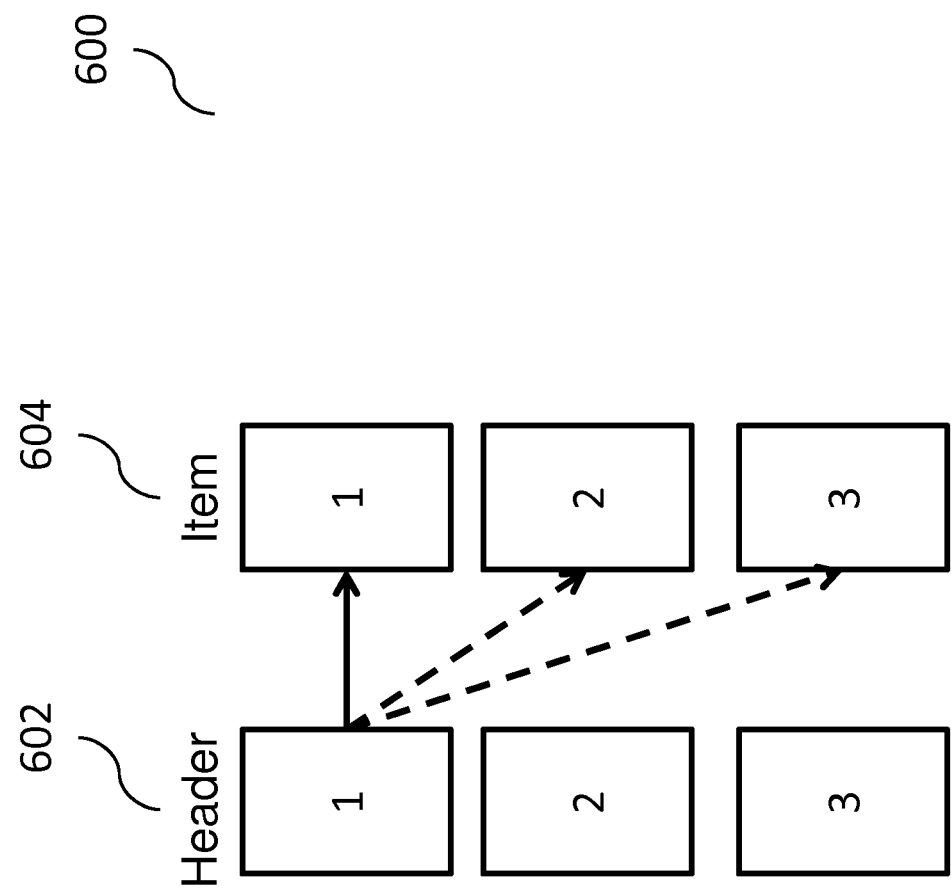
FIG. 6 illustrates an exemplary query join operation, according to some implementations of the current subject matter.

FIG. 6 illustrates an exemplary query join operation 600, according to some implementations of the current subject matter. The join operation 600 can be performed using the following query join plan:

```
SELECT * FROM header AS h INNER JOIN item AS i
    ON h.id = i.id
    WHERE h.creation_date = '2009'
```

Similar to the plan discussed above with regard to FIG. 5, the partitions corresponding to the header and the item are delimited by a particular creation date of 2009. However, the "temperature" column, which was included in the plan of FIG. 5 is not known and/or not indicated by the developer. In that regard, all partitions 1, 2, and 3 of the "item" 604 can be implemented and analyzed by the query join plan, where the join order can be determined by a query optimizer. During execution, the query join plan can evaluate the header table first and generate three independent outputs for the "header" 602 (e.g., header 1 with item 1, header 1 with item 2, and header 1 with item 3). The output values of the header partition 1 can be analyzed and can be mapped against partition profiles of the item partitions 1, 2, and 3. If there are only matches in partition 1, then data is retrieved only with regard to partition 1 and the remaining partitions 2 and 3 are ignored. Since it was not possible to eliminate the operations at plan generation time based on rules, the operations for item partitions 2 and 3 are part of the plan and the plan operations can be triggered by the executor. Since there is no input for them, they can be ignored.

In some implementations, the current subject matter can be implemented in various in-memory database systems, such as the HANA database as developed by SAP AG, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 7:
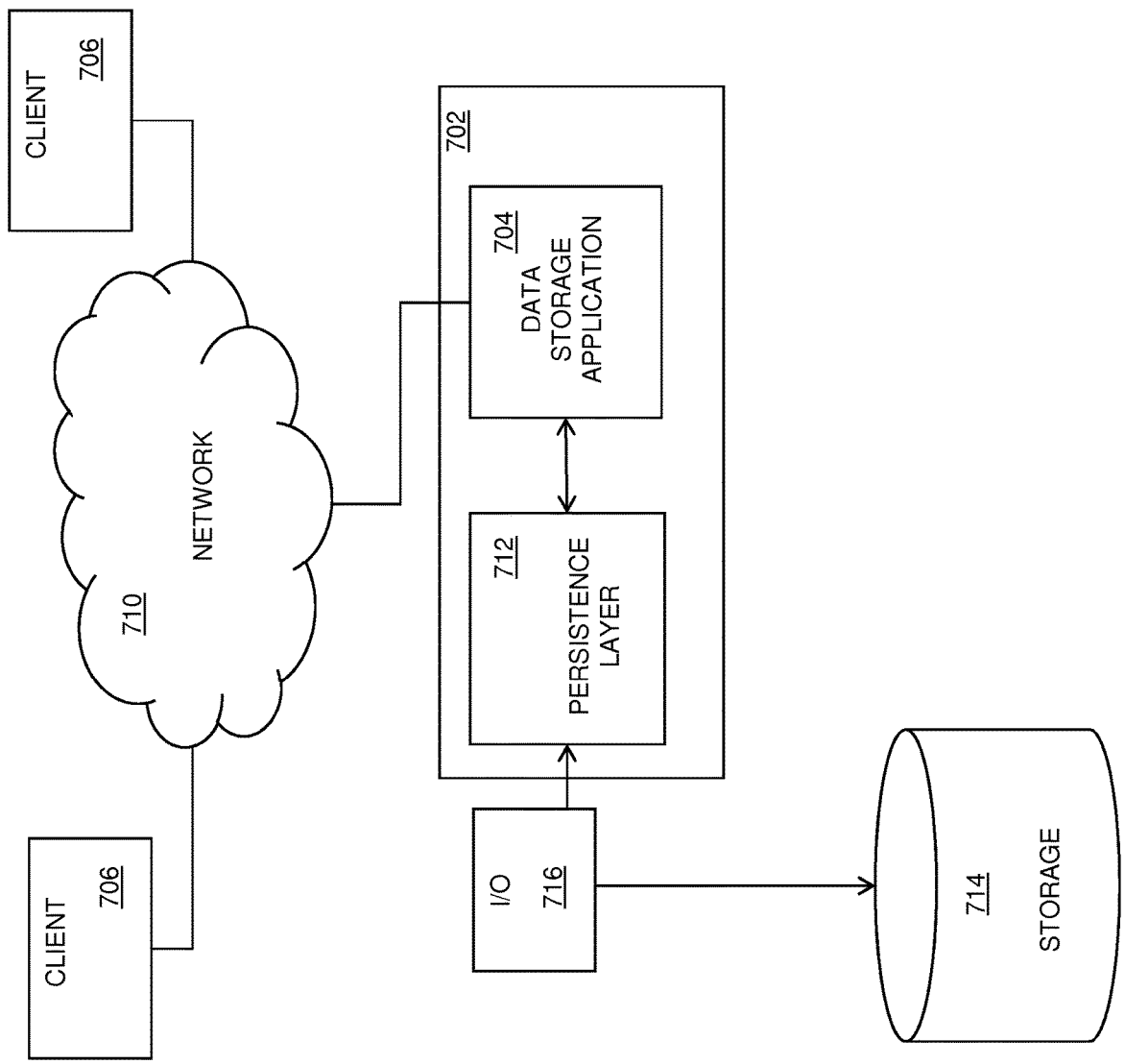
FIG. 7 is a diagram illustrating an exemplary system including a data storage application, according to some implementations of the current subject matter.

FIG. 7 illustrates an exemplary system 700 in which a computing system 702, which can include one or more programmable processors that can be collocated, linked over one or more networks, etc., executes one or more modules, software components, or the like of a data storage application 704, according to some implementations of the current subject matter. The data storage application 704 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 702 as well as to remote users accessing the computing system 702 from one or more client machines 706 over a network connection 710. One or more user interface screens produced by the one or more first modules can be displayed to a user, either via a local display or via a display associated with one of the client machines 706. Data units of the data storage application 704 can be transiently stored in a persistence layer 712 (e.g., a page buffer or other type of temporary persistency layer), which can write the data, in the form of storage pages, to one or more storages 714, for example via an input/output component 716. The one or more storages 714 can include one or more physical storage media or devices (e.g. hard disk drives, persistent flash memory, random access memory, optical media, magnetic media, and the like) configured for writing data for longer term storage. It should be noted that the storage 714 and the input/output component 716 can be included in the computing system 702 despite their being shown as external to the computing system 702 in FIG. 7.

Data retained at the longer term storage 714 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 8:
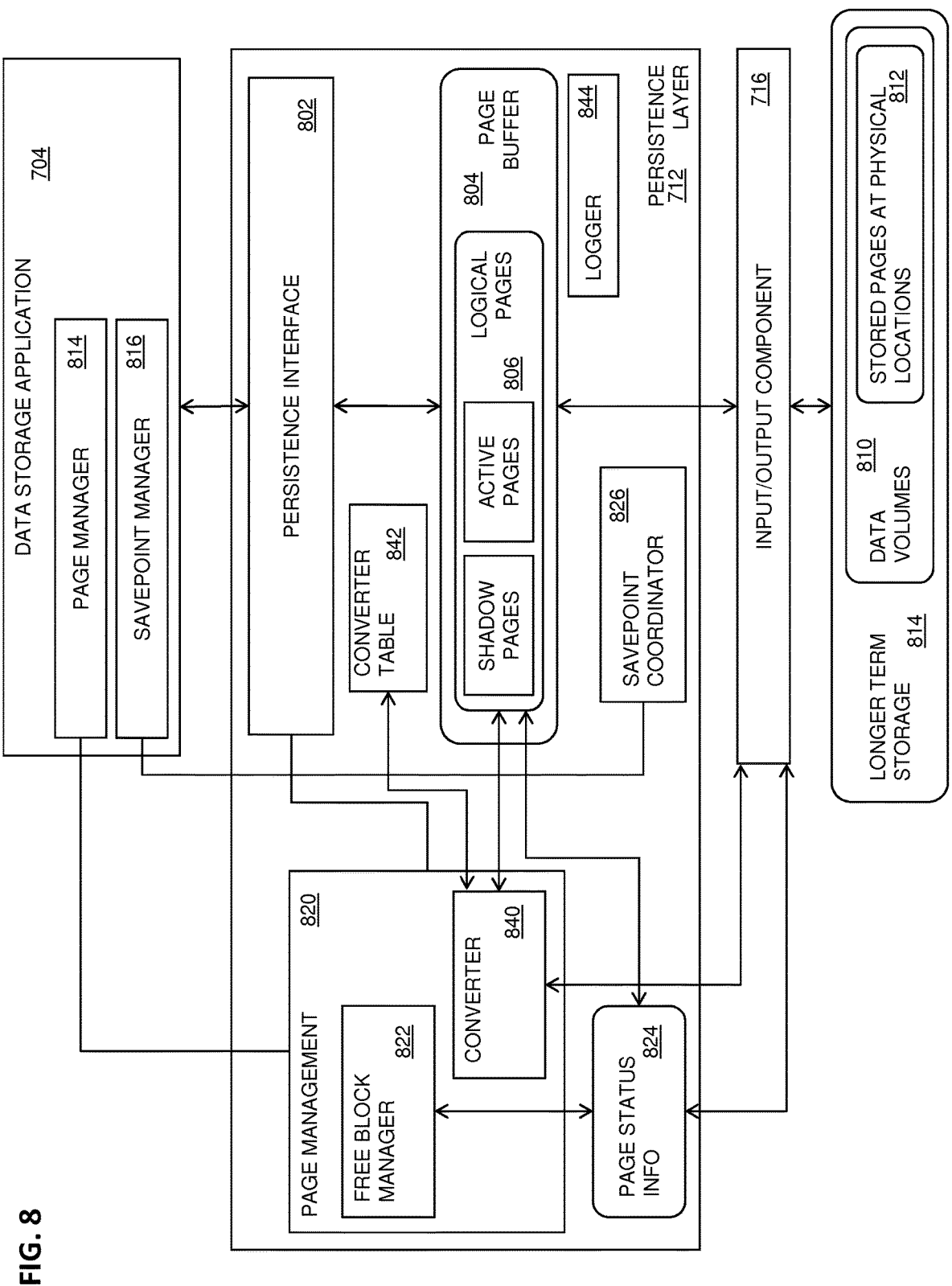
FIG. 8 is a diagram illustrating details of the system of FIG. 7.

FIG. 8 illustrates exemplary software architecture 800, according to some implementations of the current subject matter. A data storage application 704, which can be implemented in one or more of hardware and software, can include one or more of a database application, a network-attached storage system, or the like. According to at least some implementations of the current subject matter, such a data storage application 704 can include or otherwise interface with a persistence layer 712 or other type of memory buffer, for example via a persistence interface 802. A page buffer 804 within the persistence layer 712 can store one or more logical pages 806, and optionally can include shadow pages, active pages, and the like. The logical pages 806 retained in the persistence layer 712 can be written to a storage (e.g. a longer term storage, etc.) 714 via an input/output component 716, which can be a software module, a sub-system implemented in one or more of software and hardware, or the like. The storage 714 can include one or more data volumes 810 where stored pages 812 are allocated at physical memory blocks.

In some implementations, the data storage application 704 can include or be otherwise in communication with a page manager 814 and/or a savepoint manager 816. The page manager 814 can communicate with a page management module 820 at the persistence layer 712 that can include a free block manager 822 that monitors page status information 824, for example the status of physical pages within the storage 714 and logical pages in the persistence layer 712 (and optionally in the page buffer 804). The savepoint manager 816 can communicate with a savepoint coordinator 826 at the persistence layer 712 to handle savepoints, which are used to create a consistent persistent state of the database for restart after a possible crash.

In some implementations of a data storage application 704, the page management module of the persistence layer 712 can implement a shadow paging. The free block manager 822 within the page management module 820 can maintain the status of physical pages. The page buffer 804 can include a fixed page status buffer that operates as discussed herein. A converter component 840, which can be part of or in communication with the page management module 820, can be responsible for mapping between logical and physical pages written to the storage 714. The converter 840 can maintain the current mapping of logical pages to the corresponding physical pages in a converter table 842. The converter 840 can maintain a current mapping of logical pages 806 to the corresponding physical pages in one or more converter tables 842. When a logical page 806 is read from storage 714, the storage page to be loaded can be looked up from the one or more converter tables 842 using the converter 840. When a logical page is written to storage 714 the first time after a savepoint, a new free physical page is assigned to the logical page. The free block manager 822 marks the new physical page as "used" and the new mapping is stored in the one or more converter tables 842.

The persistence layer 712 can ensure that changes made in the data storage application 704 are durable and that the data storage application 704 can be restored to a most recent committed state after a restart. Writing data to the storage 714 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 844 can also be included to store the changes made to the data of the data storage application in a linear log. The logger component 844 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 844 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 712 can use a combination of undo log entries (from one or more logs) and shadow paging.

The persistence interface 802 can handle read and write requests of stores (e.g., in-memory stores, etc.). The persistence interface 802 can also provide write methods for writing data both with logging and without logging. If the logged write operations are used, the persistence interface 802 invokes the logger 844. In addition, the logger 844 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 844. For an entry of type "update", for example, this would be the identification of the affected record and the after image of the modified data.

When the data application 704 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 844 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 844 can write a database log (or simply referred to herein as a "log") sequentially into a memory buffer in natural order (e.g., sequential order, etc.). If several physical hard disks/storage devices are used to store log data, several log partitions can be defined. Thereafter, the logger 844 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 704 can use shadow paging so that the savepoint manager 816 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 9:
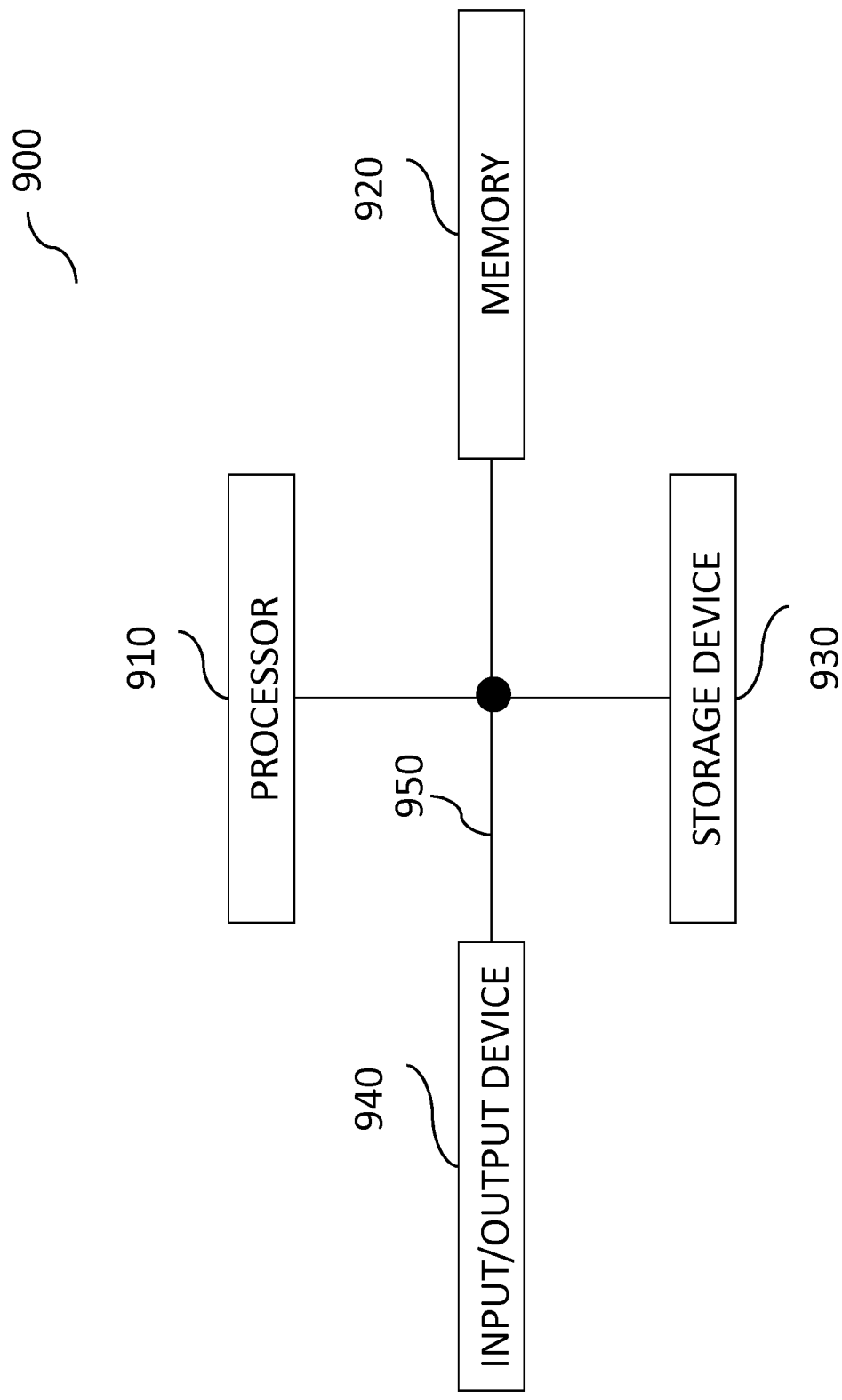
FIG. 9 illustrates an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
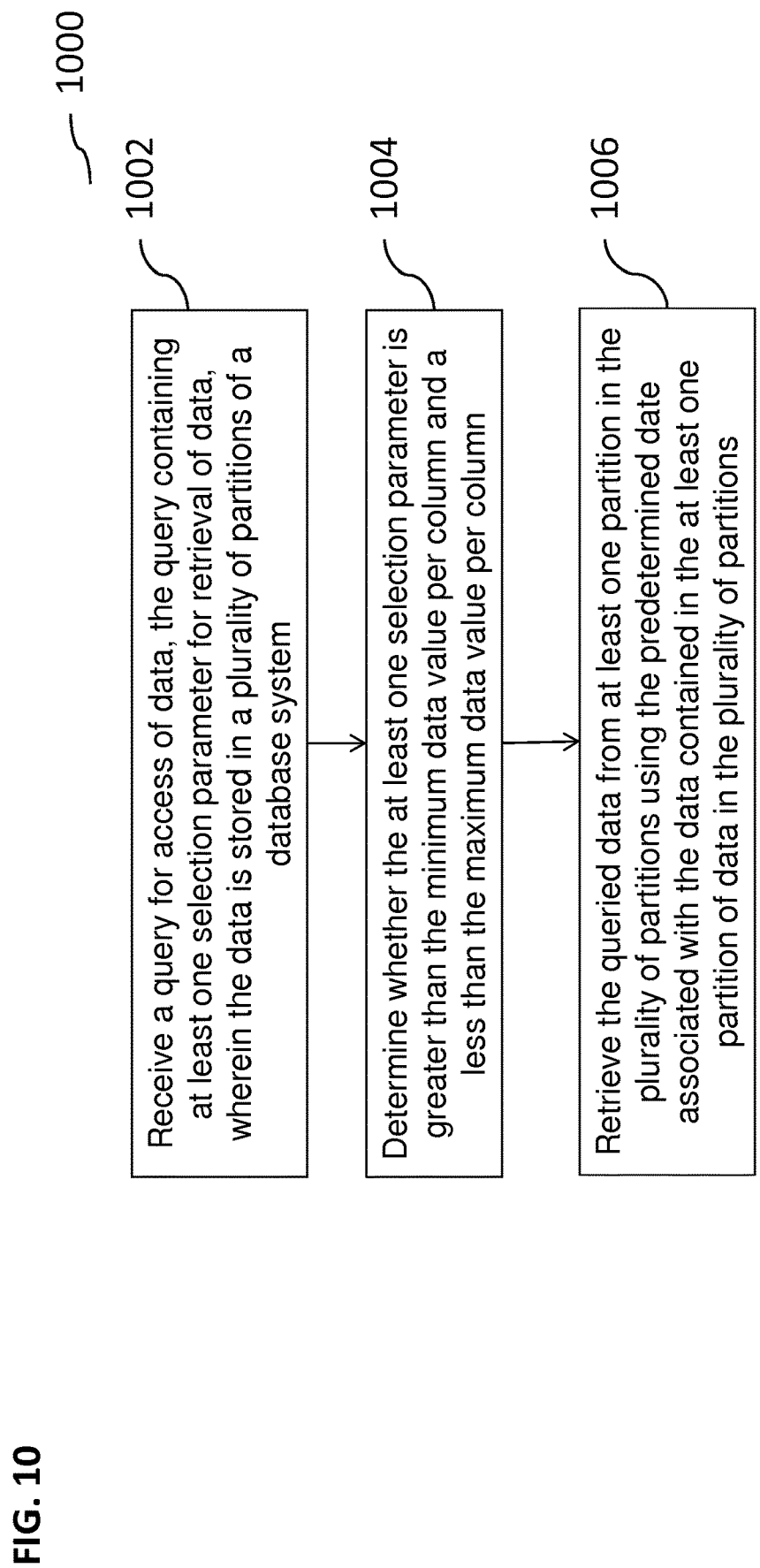
FIG. 10 illustrates an exemplary method, according to some implementations of the current subject matter.

FIG. 10 illustrates an exemplary method 1000, according to some implementations of the current subject matter. At 1002, a query for access of data can be received. The query can contain at least one selection parameter (e.g., a key associated with a business object, and/or any other parameter) for retrieval of data. The data can be stored in at least one partition in the plurality of partitions of a database system. Each partition can include a maximum data value per column, a minimum data value per column, and a predetermined date associated with the data contained in the partition of data. At 1004, the selection parameter can be compared to the minimum and maximum values and a determination can be made whether the selection parameter is greater than the minimum data value per column and a less than the maximum data value per column. If the selection parameter value is between the minimum and maximum values, then the data can be retrieved, as indicated at 1006. The retrieval can include retrieving the queried data using the predetermined date that is associated with the data contained in the at least one partition of data. The predetermined date can be used to determine which partition (hot and/or cold) to look into to obtain the queried data.

In some implementations, the current subject matter can include at least one or more of the following optional features. In some implementations, the predetermined date can be determined based on a creation date of data associated with a business object being queried by the received query. The business object can include at least one of the following: an open business object and a closed business object. The data associated with an open business object can be stored in a hot data partition and data associated with a closed business object can be stored in a cold data partition. The hot data partition can contain data having a date that is more recent than the predetermined date. The cold data partition can contain data having a date that is older than the predetermined date. In some implementations, the data stored in the hot data partition can be moved to the cold partition based on at least one of the following: when the date of the data stored in the hot data partition becomes older than the predetermined date and/or upon receiving an indicator indicating that the data stored in the hot data partition should be moved to the cold data partition. The cold data partition can include a predetermined cold data partition date. Data stored in the cold data partition and having a date that is older than the predetermined cold data partition date can be moved to another cold data partition, which can store data having a date that is older than the predetermined cold data partition date.

In some implementations, the method can also include determining whether the queried data is stored in at least two partitions of data, joining, based on the determining, the at least two partitions of data, and retrieving the joined data.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving a query for access of data, the query containing at least one selection parameter for retrieval of data, wherein the data is stored in a plurality of partitions of a database system, each partition in the plurality of partitions having a maximum data value per column, a minimum data value per column, a predetermined date associated with the data contained in the at least one partition of data, and at least one restriction for retrieval of data, the at least one restriction including at least one of the following: a date restriction and a status restriction, the date restriction including criteria for partitioning a hot data from a cold data and for partitioning the cold data, the status restriction including logic for separating the hot data from the cold data;
determining whether the at least one selection parameter is greater than the minimum data value per column and less than the maximum data value per column and whether the queried data is stored in at least two partitions of data;
selecting a joining parameter based on a boundary of an object including at least one partition of data in the plurality of partitions and based on a temperature of data indicative of whether the data in the at least two partitions of data is at least one of the following: the cold data and the hot data;
joining, using the selected joining parameter, the at least two partitions of data; and
retrieving, based on the determining, the queried joined data from the plurality of partitions using the predetermined date and the at least one restriction associated with the data contained in the plurality of partitions;
wherein the at least one of the receiving, the determining, the selecting, the joining and the retrieving is performed on at least one processor of at least one computing system.

2. The method according to claim 1, wherein the predetermined date is determined based on a creation date of data associated with a business object being queried by the received query.

3. The method according to claim 2, wherein the business object includes at least one of the following: an open business object and a closed business object.

4. The method according to claim 3, wherein data associated with an open business object is stored in a hot data partition and data associated with a closed business object is stored in a cold data partition, wherein the hot data partition contains data having a date that is more recent than the predetermined date and the cold data partition contains data having a date that is older than the predetermined date.

5. The method according to claim 4, further comprising moving the data stored in the hot data partition to the cold partition based on at least one of the following: when the date of the data stored in the hot data partition becomes older than the predetermined date and upon receiving an indicator indicating that the data stored in the hot data partition should be moved to the cold data partition.

6. The method according to claim 4, wherein the cold data partition includes a predetermined cold data partition date, whereby data stored in the cold data partition and having a date that is older than the predetermined cold data partition date is moved to another cold data partition, wherein the another cold data partition stores data having a date that is older than the predetermined cold data partition date.

7. A computer program product comprising a non-transitory machine-readable medium storing instructions that, when executed by at least one programmable processor, cause the at least one programmable processor to perform operations comprising:
receiving a query for access of data, the query containing at least one selection parameter for retrieval of data, wherein the data is stored in a plurality of partitions of a database system, each partition in the plurality of partitions having a maximum data value per column, a minimum data value per column, a predetermined date associated with the data contained in the at least one partition of data, and at least one restriction for retrieval of data, the at least one restriction including at least one of the following: a date restriction and a status restriction, the date restriction including criteria for partitioning a hot data from a cold data and for partitioning the cold data, the status restriction including logic for separating the hot data from the cold data;
determining whether the at least one selection parameter is greater than the minimum data value per column and less than the maximum data value per column and whether the queried data is stored in at least two partitions of data;

selecting a joining parameter based on a boundary of an object including at least one partition of data in the plurality of partitions and based on a temperature of data indicative of whether the data in the at least two partitions of data is at least one of the following: the cold data and the hot data;

joining, using the selected joining parameter, the at least two partitions of data; and retrieving, based on the determining, the queried joined data from the plurality of partitions using the predetermined date and the at least one restriction associated with the data contained in the plurality of partitions.

8. The computer program product according to claim 7, wherein the predetermined date is determined based on a creation date of data associated with a business object being queried by the received query.

9. The computer program product according to claim 8, wherein the business object includes at least one of the following: an open business object and a closed business object.

10. The computer program product according to claim 9, wherein data associated with an open business object is stored in a hot data partition and data associated with a closed business object is stored in a cold data partition, wherein the hot data partition contains data having a date that is more recent than the predetermined date and the cold data partition contains data having a date that is older than the predetermined date.

11. The computer program product according to claim 10, wherein the operations further comprise moving the data stored in the hot data partition to the cold partition based on at least one of the following: when the date of the data stored in the hot data partition becomes older than the predetermined date and upon receiving an indicator indicating that the data stored in the hot data partition should be moved to the cold data partition.

12. The computer program product according to claim 10, wherein the cold data partition includes a predetermined cold data partition date, whereby data stored in the cold data partition and having a date that is older than the predetermined cold data partition date is moved to another cold data partition, wherein the another cold data partition stores data having a date that is older than the predetermined cold data partition date.

13. A system comprising:

at least one programmable processor; and a machine-readable medium storing instructions that, when executed by the at least one programmable processor, cause the at least one programmable processor to perform operations comprising:

receiving a query for access of data, the query containing at least one selection parameter for retrieval of data, wherein the data is stored in a plurality of partitions of a database system, each partition in the plurality of partitions having a maximum data value per column, a minimum data value per column, a predetermined date associated with the data contained in the at least one partition of data, and at least one restriction for retrieval of data, the at least one restriction including at least one of the following: a date restriction and a status restriction, the date restriction including criteria for partitioning a hot data from a cold data and for partitioning the cold data, the status restriction including logic for separating the hot data from the cold data;

determining whether the at least one selection parameter is greater than the minimum data value per column and less than the maximum data value per column and whether the queried data is stored in at least two partitions of data;

selecting a joining parameter based on a boundary of an object including at least one partition of data in the plurality of partitions and based on a temperature of data indicative of whether the data in the at least two partitions of data is at least one of the following: the cold data and the hot data;

joining, using the selected joining parameter, the at least two partitions of data; and retrieving, based on the determining, the queried joined data from the plurality of partitions using the predetermined date and the at least one restriction associated with the data contained in the plurality of partitions.

14. The system according to claim 13, wherein the predetermined date is determined based on a creation date of data associated with a business object being queried by the received query.

15. The system according to claim 14, wherein the business object includes at least one of the following: an open business object and a closed business object.

16. The system according to claim 15, wherein data associated with an open business object is stored in a hot data partition and data associated with a closed business object is stored in a cold data partition, wherein the hot data partition contains data having a date that is more recent than the predetermined date and the cold data partition contains data having a date that is older than the predetermined date.

17. The system according to claim 16, wherein the operations further comprise moving the data stored in the hot data partition to the cold partition based on at least one of the following: when the date of the data stored in the hot data partition becomes older than the predetermined date and upon receiving an indicator indicating that the data stored in the hot data partition should be moved to the cold data partition.

18. The system according to claim 16, wherein the cold data partition includes a predetermined cold data partition date, whereby data stored in the cold data partition and having a date that is older than the predetermined cold data partition date is moved to another cold data partition, wherein the another cold data partition stores data having a date that is older than the predetermined cold data partition date.

* * * * *